W. E. McCORQUODALE.
HAY PRESS.
APPLICATION FILED OCT. 11, 1920.

1,401,715.

Patented Dec. 27, 1921.
2 SHEETS—SHEET 1.

Wilmer E. McCorquodale.
INVENTOR.

BY
ATTORNEYS.

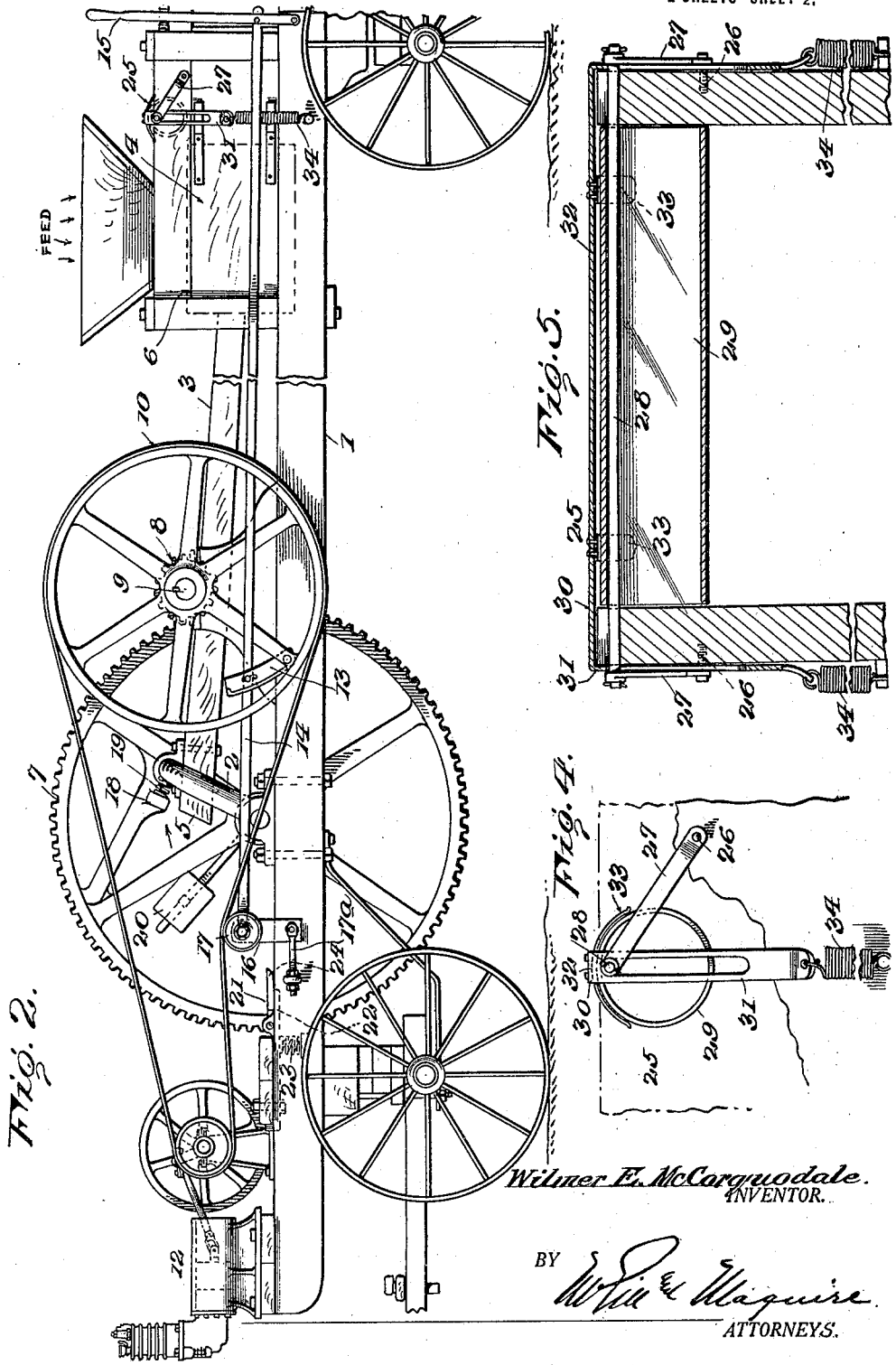

UNITED STATES PATENT OFFICE.

WILMER ELMER McCORQUODALE, OF ORANGE, TEXAS.

HAY-PRESS.

1,401,715.

Specification of Letters Patent. Patented Dec. 27, 1921.

Application filed October 11, 1920. Serial No. 416,131.

*To all whom it may concern:*

Be it known that I, WILMER ELMER MC-CORQUODALE, of Orange, in the county of Orange and State of Texas, have invented certain new and useful Improvements in Hay-Presses; and I do hereby declare the following to be a full, clear, and exact description of the invention, such as will enable others skilled in the art to which it appertains to make and use the same.

My object is to provide certain improvements in power driven hay presses, having special reference to that class of machines in which a plunger or baling head has its rod secured to the wrist of a crank shaft which is alternately acted upon by power driven mechanism to compress the material, the intermediate thrust of the plunger being free of the power mechanism and due to the expansion of the material in the baling chamber.

Figure 1:
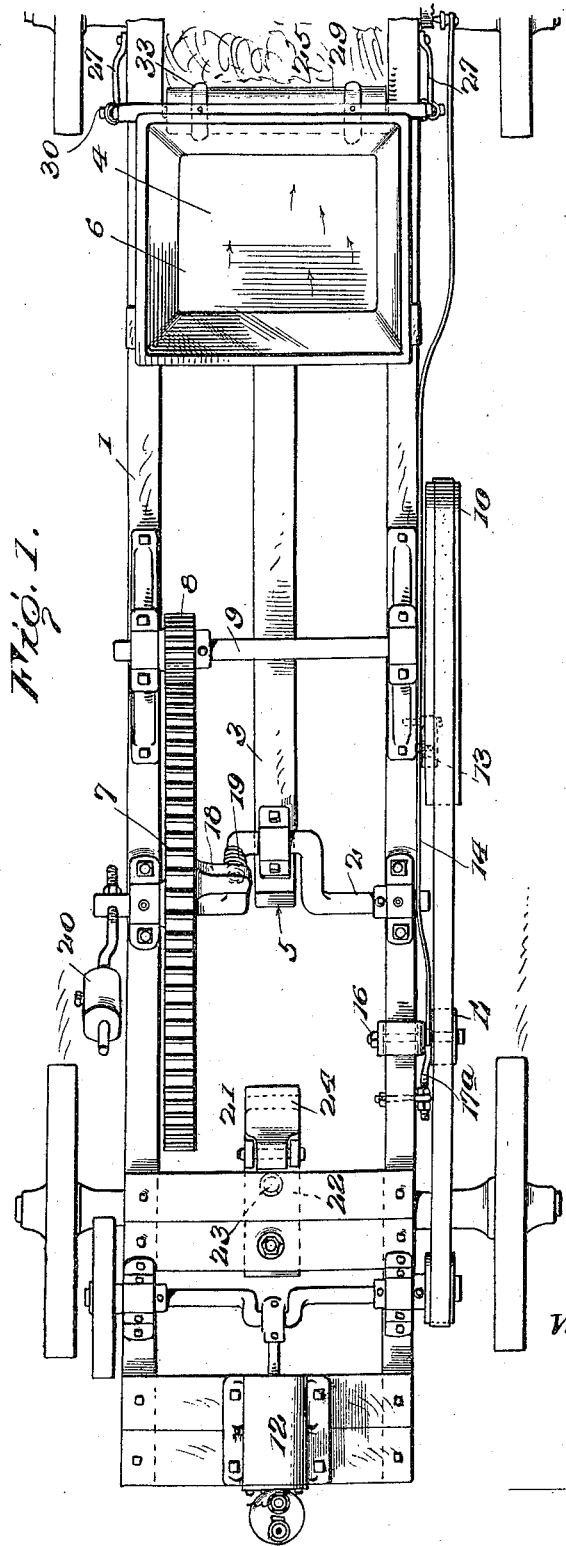
Figure 3:
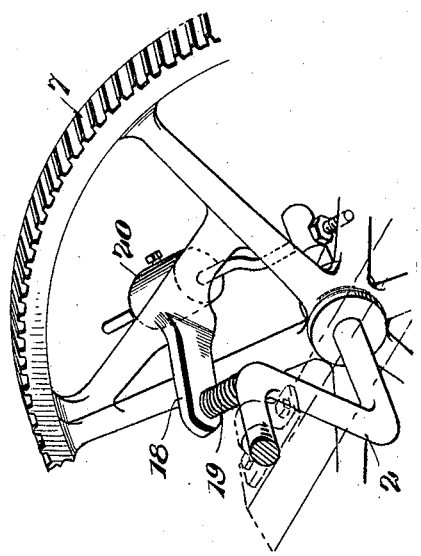

In the drawings, Figure 1 is a plan view of a press embodying my improved features. Fig. 2 is a partial side elevation. Fig. 3 is a detail of the contact lug on the spur gear. Figs. 4 and 5 are details of the the crimper or tucker attachment.

Upon the side rails of a suitable frame 1 I mount a crank shaft 2 transversely. To the wrist of this shaft is secured the rod 3 of a plunger baling head 4. The extremity 5 of the rod projects a short way beyond the point of connection to the wrist. The head 4 is adapted to operate in a baling chamber 6.

A spur gear or bull-wheel 7 is shown mounted to rotate freely on the crank shaft and may be turned by a pinion 8 on a shaft 9 having a band wheel 10 connected with an appropriate motor 12. The spur gear may, of course, be directly connected with the motor and the pinion and wheel 10 omitted. I prefer the construction shown, however, because the wheel acts as a balance or fly wheel and allows of providing an effective brake device. For this purpose I form the wheel with sufficiently wide rim and fulcrum a brake shoe 13 on the frame. A rod 14 extends along the side of the frame and is attached to a hand lever 15. This rod is also attached to an idler support 16 whose pulley 17 normally holds the driving band taut. The support is pivoted on the frame and the tension of the band tends to hold it upright. When lever 15 is operated to apply the brake, however, the rod 14 not only causes the shoe 13 to contact with the wheel 10 but also lowers the idler support, thus loosening the belt and stopping the mechanism. The idler support has an adjustable rod 17$^a$ which limits its movement, the rod being movable in a guide mounted in the frame and threaded to receive the two nuts.

The spur gear 7 is equipped with a contact lug 18 adapted to engage the crank shaft. As shown in detail in Fig. 3 the lug is cast on the wheel and formed with a recess in which is seated a spring 19. This permits of firm contact but allows for yielding sufficiently to prevent damage due to sudden impact. The crank shaft carries a counter weight 20.

At 21 I have shown a latch device to coact with the extremity 5 of the rod 3. This extremity is beveled as shown in Fig. 2. The latch comprises a base plate 22 secured to the frame and having a spring 23 set in a countersunk recess in the frame to lessen the jar. A latch plate 24 having a beveled extremity is pivoted for upward movement on the base plate and lies in the path of travel of the extremity 5 of the plunger rod.

The crank shaft is shown nearing the completion of its compression stroke. When it reaches the dead center the combined forces of the counterweight and the expansive action of the hay being compressed cause the crank-shaft to quickly turn downward and around to the opposite center, moving away from contact with the lug 18. As the crank wrist rises at the left the extremity 5 of the plunger rod will engage and lift and pass beyond the latch plate 24 due to momentum. The latch plate will drop back to its normal position and the extremity of the plunger rod will fall back upon it and remain at rest until the continuous rotation of the spur gear again causes the lug 18 to lift and partially rotate the crank shaft for a succeeding compression.

I make provision for crimping or tucking in the ragged ends of the hay on each charge. This is accomplished by a roller mechanism indicated generally at 25 and mounted in the baling chamber. Fulcrumed on a pivot pin 26 at each side of the frame is a link 27. A pin 28 connects the two links and carries a hollow roller 29. A yoke 30 has its depending sides 31 slotted to receive the ends of the pin and it bridges lengthwise over the roller. Its bridge portion 32 is formed with laterally extending arms 33 which are curved to fit over and bear upon the roller. Springs 34 connect the sides 31 with a fixed portion of the frame and tend to draw the roller mechanism downward. As the plunger advances the hollow roller is raised upon the charge of hay until its lower wall contacts with the rod 28. Then the rod and the yoke may rise with the roller. On the backward stroke the parts are retracted by the springs. This action crimps in the ends of the hay. Owing to the links 27 being pivoted to the pins 26 the roller may move longitudinally with the plunger as well as vertically.

I claim as my invention:

1. In a hay press, the combination with a plunger and a crank shaft connected to said plunger, of a spur gear to operate said crank shaft, said spur gear having a lug to intermittently contact with said crank shaft, said lug being formed with a recess, and a spring seated in said recess.

2. In a hay press, the combination with a plunger and a crank shaft connected to said plunger, the plunger rod having an extremity extending rearward of the crank wrist, of means to operate said crank shaft, and a latch in the path of travel of said extremity of the plunger rod.

3. In a hay press, the combination with a plunger and a crank shaft connected to said plunger, the plunger rod having an extremity extending rearward of the crank wrist, of means to operate said crank shaft, and a latch in the path of travel of said extremity of the plunger rod, said latch comprising a base plate, a spring beneath said plate, and a pivoted plate adapted for upward movement.

4. In a hay press, the combination with a plunger, a crank shaft connected to said plunger, and a spur gear to operate said crank shaft, of a pinion meshing with said spur gear, a band wheel to rotate said pinion, a pivoted idler support having a band pulley, a brake shoe to engage the rim of said wheel, a rod connected to said idler support and to said brake shoe, and means for operating said rod.

5. In a hay press, the combination with a plunger mechanism, of a crimping device comprising a roller adapted to engage the charge being compressed, a pin supporting said roller, pivotally mounted links supporting said pin at its ends, and springs tending to draw said roller and supporting parts downward.

6. In a hay press, the combination with a plunger mechanism, of a crimping device comprising a hollow roller adapted to engage the charge being compressed, a pin supporting said roller, pivotally mounted links supporting said pin at its ends, a yoke extending lengthwise over said roller and having downward projecting slotted ends receiving said pin, and springs tending to draw said ends downward.

7. In a hay press, the combination with a plunger mechanism, of a crimping device comprising a hollow roller adapted to engage the charge being compressed, a pin supporting said roller, pivotally mounted links supporting said pin at its ends, a yoke extending lengthwise over said roller and having laterally extending curved arms fitting over and bearing upon the roller, and also having downward projecting slotted ends receiving said pin, and springs tending to draw said ends downward.

In testimony whereof I have signed this specification.

WILMER ELMER McCORQUODALE.